US007216255B2

(12) United States Patent
Cabrera et al.

(10) Patent No.: US 7,216,255 B2
(45) Date of Patent: *May 8, 2007

(54) ADAPTIVE RECOVERY FROM SYSTEM FAILURE FOR APPLICATION INSTANCES THAT GOVERN MESSAGE TRANSACTIONS

(75) Inventors: Luis Felipe Cabrera, Bellevue, WA (US); George P. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

This patent is subject to a terminal disclaimer.

(21) Appl. No.: 10/764,096

(22) Filed: Jan. 23, 2004

(65) Prior Publication Data

US 2005/0177759 A1 Aug. 11, 2005

(51) Int. Cl.
*G06F 11/00* (2006.01)

(52) U.S. Cl. .......................................... 714/21; 714/15

(58) Field of Classification Search ................... 714/21
See application file for complete search history.

(56) References Cited

U.S. PATENT DOCUMENTS

| | | | |
|---|---|---|---|
| 5,557,798 A | 9/1996 | Skeen et al. ................. 395/650 |
| 5,627,964 A * | 5/1997 | Reynolds et al. ............. 714/46 |
| 5,931,954 A * | 8/1999 | Hoshina et al. ................ 714/15 |
| 6,009,012 A * | 12/1999 | Sibigtroth et al. ..... 365/185.04 |
| 6,044,475 A * | 3/2000 | Chung et al. .................. 714/15 |
| 6,260,057 B1 * | 7/2001 | Eykholt et al. .............. 718/102 |
| 6,820,218 B1 * | 11/2004 | Barga et al. .................... 714/17 |
| 6,843,423 B2 * | 1/2005 | Fruhauf et al. .............. 235/492 |
| 2005/0198554 A1 * | 9/2005 | Cabrera et al. ................ 714/15 |

OTHER PUBLICATIONS

Efficient Message Dispatch in Object-Oriented Systems Mayur Naik and Rejeev Kumar Mar. 2000 p. 49-58 ACM SIGPLAN.
Cybernetics and Systems-Towards a Unified Messaging Environment Over the Internet Leonard Chong, Siu Cheung Hui and Chai Kiat Yeo 1999 p. 533-549.
ECOOP '95 Object-Oriented Programming Message Dispatch on Pipelined Processors Karel Driesen, Urs Holzle and Jan Vitek 1995 p. 252-282.

* cited by examiner

*Primary Examiner*—Scott Baderman
*Assistant Examiner*—Joshua Lohn
(74) *Attorney, Agent, or Firm*—Workman Nydegger

(57) ABSTRACT

Mechanisms for adaptively entering and exiting recovery mode. When a message is received from a particular message transaction, the appropriate processing instance is loaded from persistent memory to system memory. The processing instance then determines from its own state information whether or not it is in recovery mode. This indication of recovery or normal mode may be set by a system-wide recovery detection module. If the processing instance determines that it is in normal mode, then the processing instance executes code appropriate for normal operation without needing to execute any recovery code at all. If, on the other hand, the processing instance determines that it is in recovery mode, then it executes recovery code. Once the recovery code has completed successfully, the processing instance may then cause its own normal mode.

13 Claims, 3 Drawing Sheets

ADAPTIVE RECOVERY FROM SYSTEM FAILURE FOR APPLICATION INSTANCES THAT GOVERN MESSAGE TRANSACTIONS

BACKGROUND OF THE INVENTION

1. The Field of the Invention

The present invention relates to computing technology; and more specifically, to mechanisms that allow application instances that govern message transactions to adaptively recover from system failure.

2. Background and Related Art

Computing technology has transformed the way we work and play. Computing systems now take a wide variety of forms including desktop computers, laptop computers, tablet PCs, Personal Digital Assistants (PDAs), household devices and the like. Currently, computing system technology has improved significantly. Numerous application instances may run on a single computing system at the same time. This complexity provides for ever-improving computing utility.

Despite such improvements, however, computing systems do still occasionally experience system failures. Some system failures may prohibit the computing system from performing clean up processes prior to shutting down completely. Accordingly, instances that were in process at the time of the system failure may have inconsistent state and run improperly during subsequent power-up.

In order to avoid this, many conventional applications perform some level of self-consistency checking upon execution to ensure that the application is operating with consistent state. Such self-consistency checking can be quite processor intensive depending on the level of self-consistency checking. The self-consistency checking is often performed regardless of whether or not there was a prior system failure that would cause inconsistent state. Accordingly, many times, the self-consistency checking is for naught since most of the time the computing system is shut down safely and the application was previously terminated properly, thereby resulting in consistent state.

What would be advantageous are mechanisms in which application state consistency is protected while conserving processing resources.

BRIEF SUMMARY OF THE INVENTION

The foregoing problems with the prior state of the art are overcome by the principles of the present invention, which are directed towards mechanisms for adaptively entering and exiting recovery mode. An application is responsible for governing a message exchange pattern that accomplishes a particular task. A processing instance of that application is responsible for governing a specific message transaction with a particular client computing system using the message exchange pattern. As the message transaction may be a long running communication, it is possible that corresponding processing instances may suffer a system failure or otherwise lose state consistency during the lifetime of the transaction.

When a message corresponding to a message transaction is received, the corresponding processing instance (or at least the corresponding state information) is loaded from a persistent media (e.g., persistent memory and/or a magnetic disk) to system memory. The processing instance then determines from the state information whether or not the processing instance is in recovery mode. A computing system typically has two modes of operation, a "normal" mode and a "recovery" mode. The recovery mode uses logic that is executed when recovering from a system failure. In the principles of the present invention, individual processing instances have operational modes including a normal mode and a recovery mode. After identifying the operational mode for an instance, the application then branches process flow depending on whether or not the processing instance is in recovery mode. The processing instance may determine whether or not the processing instance is in recovery mode by checking a recovery mode flag which may be set or reset by a recovery detection component. The flag may be part of the state information for the processing instance. This flag may be stored durably in an appropriate persistent media and may be included as part of the state information for the corresponding processing instance.

If the processing instance determines that it is in normal mode, then the processing instance executes code appropriate for normal operation without needing to execute any recovery code at all. If, on the other hand, the processing instance determines that it is in recovery mode, then the processing instance executes recovery code. Once the recovery code has completed successfully, the processing instance may then reset the flag to indicate that it is operating in normal mode.

The recovery mode information may be set by the recovery detection module, which may detect that there is a problem with normal operation. The recovery detection module may detect the improper operation or state in any manner. In one example, whenever a message is received, after the corresponding processing instance (or just the state information) has been loaded into system memory, and the processing instance has determined that it is in normal mode thereby allowing the processing instance to engage in normal operation, the recovery detection module sets the state information to indicate that it is in recovery mode. The processing instance continues though with normal operation. If the processing instance terminates normally, the recovery detection module changes the state information to once again indicate normal mode for the processing instance. If the processing instance terminates abnormally, the recovery detection module does not make this change, thereby leaving the state information with the indication of recovery mode.

This mechanism allows each processing instance to have its own recovery mode information. Accordingly, one processing instance of an application may be operating in recovery mode, while another is in normal mode, even if the processing instances are instances of the same application. Once each processing instance has convinced itself that it is operating properly, then the processing instance enters normal mode. The recovery mechanism allows the application programmer to rely on the system to determine whether or not the processing instance is operating in normal or recovery mode. The application simply makes one check of its own state information to make the determination of normal or recovery mode. If a processing instance of the application is operating in normal mode, then the processing instance may immediately enter normal operation mode, thereby saving the processing associated with the processing instance performing further checks to see if it should be operating in recovery mode. Accordingly, the determination whether the recovery logic is to be invoked is efficient.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
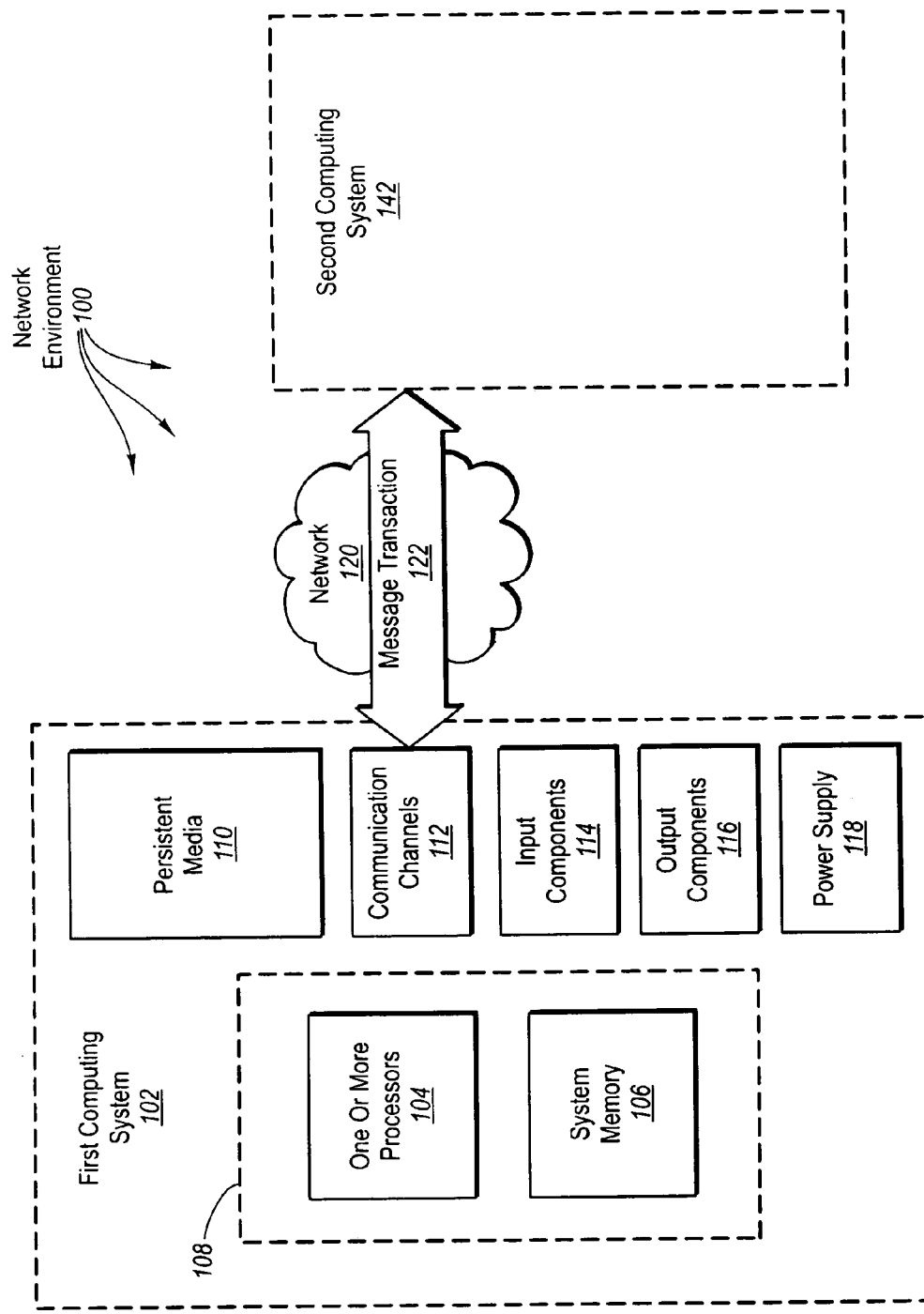
FIG. 1 illustrates a suitable computing system that may implement features of the present invention.

The principles of the present invention relate to mechanisms for adaptively entering and exiting recovery mode. An application is responsible for governing a message exchange pattern that accomplishes a particular task. A processing instance of that application is responsible for governing a specific message transaction with a particular client computing system using the message exchange pattern. When a message corresponding to a message transaction is received, the appropriate processing instance or state is loaded from a persistent media to system memory. The processing instance then determines from its own state information whether or not the processing instance was is in recovery mode. This indication of recovery or normal mode may be set by a system-wide recovery detection module.

If the processing instance determines that it is in normal mode, then the processing instance executes code appropriate for normal operation without needing to execute any recovery code at all. If, on the other hand, the processing instance determines that it is in recovery mode, then the processing instance executes recovery code. Once the recovery code has completed successfully, the processing instance may then reset the flag to indicate that it is operating in normal mode.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computing systems, unless indicated otherwise. As such, it will be understood that such acts and operations, which are at times referred to as being computer-executed, include the manipulation by one or more processors of the computing system of electrical signals representing data in a structured form. This manipulation transforms the data or maintains them at locations in the memory system of the computer, which reconfigures or otherwise alters the operation of the computing system in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

FIG. 1 shows a schematic diagram of an example network environment in which the principles of the present invention may be employed. The network environment 100 includes a computing system 102. For descriptive purposes, the architecture portrayed for the computing system 102 is only one example of a suitable computing system in which the principles of the present invention may be employed. The architecture described for the computing system 102 is not intended to suggest any limitation as to the scope of use or functionality of the invention. Neither should the computing systems described herein be interpreted as having any dependency or requirement relating to anyone or combination of components illustrated in FIG. 1. In this description and in the claims, a computing system is defined as any system having one or more processors that are capable of executing instructions from system memory.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration represented within the dashed lines 108, the computing system 102 typically includes one or more processors 104 and system memory 106. The system memory 106 is most typically volatile and may be, for example, Random Access Memory, although this is not required. The computing system 102 also includes persistent media 110 which may include any storage media capable of storing information despite system failures. For example, persistent media 110 may include magnetic or optical storage devices, although this is not required.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112, that allow the host to communicate with other systems and devices such as, for example, second computing system 142. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

The computing system 102 may communicate with any number of computing systems over a network 120. However, in the illustrated embodiment, the first computing system 102 is communicating with the second computing system 142 over the network 120. In order to accomplish the task, the computing systems 102 and 142 exchange messages in a particular pattern of exchange represented generally by message transaction 122. Also, the use of the terms "first", "second" and so forth to modify an item is only intended to distinguish one item from another, and does not imply any sort of sequential ordering per se.

The particular message exchange pattern associated with the transaction 122 defines which computing system is to send which message at any given point in the message exchange. The message exchange pattern depends on the task to be accomplished, and the protocols used to exchange messages. The messages may be any electronic message such as, for example, a HyperText Transport Protocol (HTTP) message or a Simple Object Access Protocol (SOAP) message.

Figure 2:
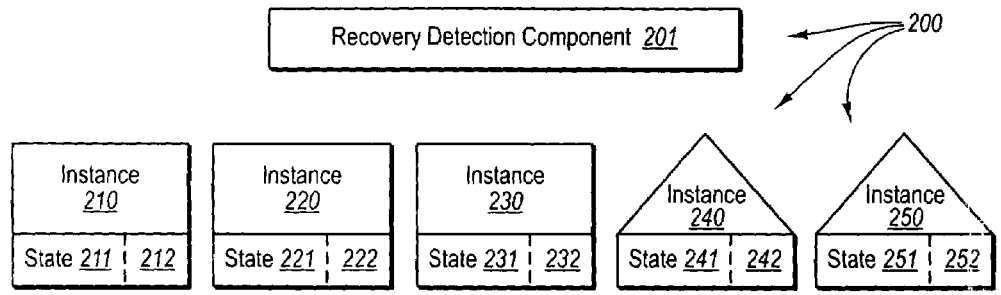
FIG. 2 illustrates various components that may be instantiated in system memory in accordance with the principles of the present invention.

FIG. 2 illustrates various components 200 that may be instantiated in system memory 106 in accordance with the principles of the present invention. The computing system 102 may be engaged in multiple message transactions. A "message transaction" is defined as an exchange of messages with a particular client computing system, the exchange following a message exchange pattern. Accordingly, the system memory may include information for multiple transactions.

There is state information corresponding to each of the transactions. For example, state information 211, 221, 231, 241 and 251 each corresponding to an individual message transaction. Accordingly, in the illustrated embodiment of FIG. 2, the computing system has state information for five different message transactions in system memory. Each of the state information has recovery mode information indicating whether or not the corresponding processing instance is in recovery mode or normal mode. For example, state information 211, 221, 231, 241 and 251 include corresponding recovery mode information 212, 222, 232, 242 and 252.

In addition to state information, the computing system needs appropriate executable code in order to properly manage a message transaction. In one embodiment referred to herein as the "per transaction instance embodiment", each message transaction may be governed by a processing instance of an application designed for the corresponding message transaction type.

Suppose, in this example, that state information 211, 221 and 231 correspond to state information for different message transactions of the same message exchange pattern type. In the per transaction instance embodiment, each of the state information 211, 221 and 231 is managed by a corresponding processing instance 210, 220, and 230 of an application that is designed to manage message transactions of that particular message exchange pattern type. Accordingly, each of the processing instances 210, 220 and 230 are illustrated as being rectangular, to emphasize that they are processing instances of the same application.

Suppose also that state information 241 and 251 correspond to different message transactions of the same message exchange pattern type, that is different than the message transaction type for processing instances 210, 220 and 230. In the per transaction instance embodiment, each of the state information 241 and 251 is managed by a corresponding processing instance 240 and 250 of an application that is designed to manage message transactions of the different transaction type. These processing instances 240 and 250 are illustrated as being triangular, to emphasize that they are processing instances of the same application, but a different application than the processing instances 210, 220 and 230.

In another embodiment referred to herein as "the multiple transaction instance embodiment", a single processing instance of an application may be able to simultaneously manage multiple message transactions of the same message exchange pattern type. In that case, state 211, 221 and potentially 231 may be managed by a single processing instance (e.g., processing instance 210) of an application, while state 241 and 242 would be managed by a single processing instance (e.g., processing instance 240) of another application.

In yet another embodiment referred to herein as "the multiple message exchange pattern instance embodiment", a single processing instance of an application may be able to simultaneously manage multiple message transactions of different message exchange pattern types. In that case, state 211, 221, 231, 241 and 251 may all be managed by a single processing instance (e.g., processing instance 210).

The principles of the present invention apply regardless of whether the per transaction instance embodiment, the multiple transaction instance embodiment, or the multiple message exchange pattern instance embodiment is in effect. However, the remainder of this description will focus on the per transaction instance embodiment as illustrated in FIG. 2.

Each message exchange pattern type may correspond to a particular task type. For example, the application corresponding to processing instances 210, 220 and 230 may govern message exchange patterns for purchasing an airplane. Each processing instance is responsible for governing a particular transaction that corresponds to the message exchange pattern. For example, processing instance 210 may govern a message exchange pattern for client A's purchase of an airplane; processing instance 220 may govern a message exchange pattern for client B's purchase of an airplane; and processing instance 230 may govern a message exchange pattern for client C's purchase of an airplane. Furthermore, the application corresponding to processing instances 240 and 250 may govern message exchange patterns for paying off a mortgage. For example, processing instance 240 may govern a message pattern for client D's payment of a mortgage; while processing instance 250 may govern a message pattern for client E's payment of a mortgage.

The system memory also has instantiated thereon a recovery detection component 201, which is configured to detect when a processing instance corresponding to message transaction state information is in recovery mode, and then record the recovery mode status in the corresponding state information.

Figure 3:
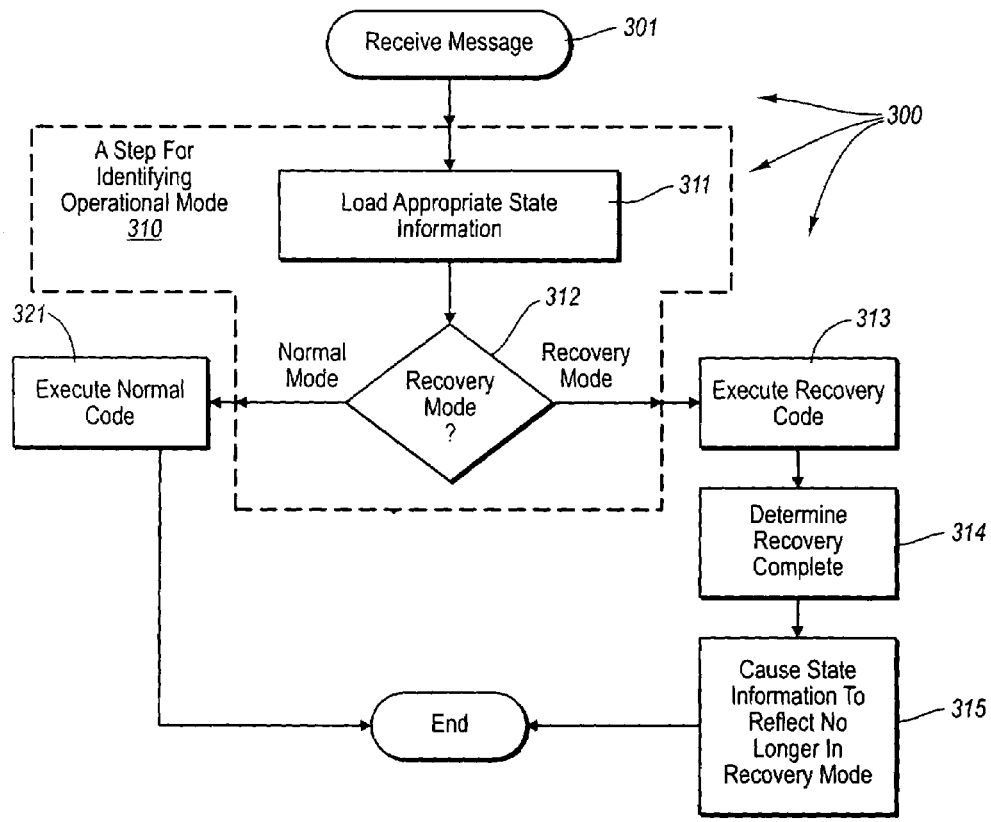
FIG. 3 illustrates a flowchart of a method for efficiently recovering from recovery mode in accordance with the principles of the present invention.

FIG. 3 illustrates a flowchart of a method 300 for efficiently recovering from recovery mode in accordance with the principles of the present invention. The method may be repeated for each message in a message transaction.

The message is initiated when a message corresponding to the message transaction is received (act 301). The message may be a HyperText Transport Protocol (HTTP) message and/or a Simple Object Access Protocol (SOAP) envelope, or any other message capable of being communicated over a network. The message transaction may be identified in the message itself.

The method 300 then includes the performance of a functional, result-oriented step for identifying an operational mode of a processing instance corresponding to the particular message exchange pattern (step 310). This may include any corresponding acts for accomplishing this result. However, in the illustrated embodiments, this includes act 311 and decision block 312.

Specifically, the computing system loads state information for the message transaction from persistent memory to system memory in response to having received the message (act 311). For example, referring to FIGS. 1 and 2, if the computing system 102 received a message for the transaction corresponding to state information 211, state information 211 would be loaded from persistent memory 110 to system memory 106. If there was not a processing instance associated with the transaction already in system memory, the appropriate processing instance may be instantiated in system memory at that time.

The computing system then determines from the state information whether or not the processing instance associated with the message transaction is in recovery mode (decision block 312). The processing instance itself may make this determination. Referring again to FIGS. 1 and 2, this may be accomplished by the computing system 102 (more specifically, the processing instance 210) reading the recovery mode information 212 from the state information 211. The computing system then branches process flow depending on whether or not the processing instance is in recovery mode.

Specifically, if the processing instance determines that the processing instance is in normal mode, the processing instance executes normal code without executing recovering code (act 321). Upon completion of the normal code, the state information may be stored back in persistent memory. If, on the other hand, the processing instance determines that the processing instance is in recovery mode, then the processing instance executes recovery code (act 313). At some point while and after executing the recover code, the processing instance determines that the recovery has completed successfully (act 314). What determines success will vary depending on the needs of the message transaction. However, the processing instances itself is in control of its own recovery. After determining that recovery has completed, the processing instances causes the state information to reflect that the processing instance is no longer in recovery mode (act 315). The processing instance may do this by directly altering the recovery mode information for the corresponding state information of the message transaction. Whether or not the processing instance is operating in normal mode or recovery mode, the state information may be loaded back into persistent memory.

By loading state information from persistent memory to system memory when a message for the transaction is received, and by storing the state information back into persistent memory once the processing for the message is complete, long running transactions are supported. In long running transactions, it is likely that at some point during the transaction, there will be a system failure. However, since the state information for the transaction is stored in persistent memory, the transaction survives such system failures. Furthermore, since the principles of the present invention provide for an adaptive way for each transaction to recover from system failures, the transaction will survive even if the transaction needs to occasionally recovery from abnormal operation.

In some cases, the processing instance will not be able to fully recover without further communication with another computing system. For example, suppose that the processing instance executes recovery code that determines that it has received three messages, when, upon inquiry to the recovery detection component 201, the processing instance learns that it should have received five messages. The processing instance may then engage in a message exchange pattern with the other computing system for the purpose of acquiring the other two messages.

Figure 4:
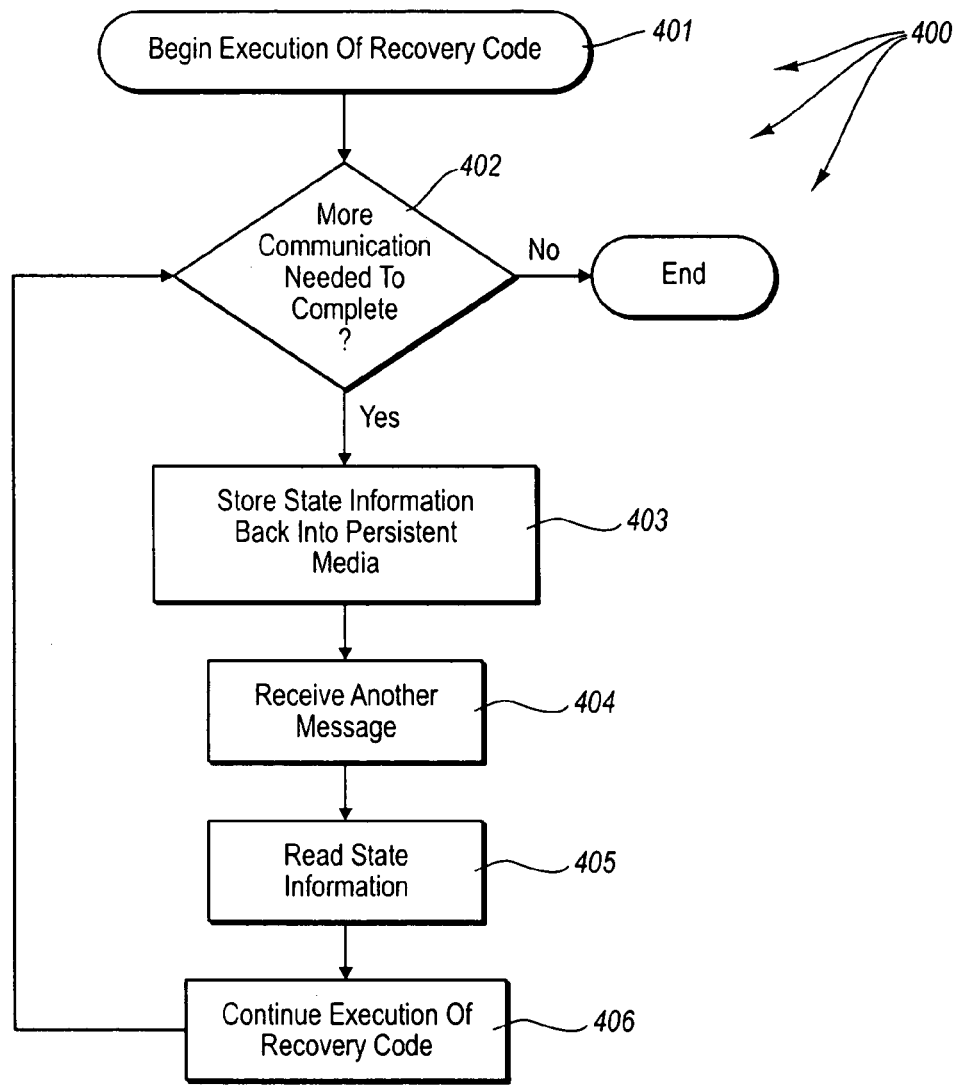
FIG. 4 illustrates a flowchart of a method for executing recovery code.

FIG. 4 illustrates a method 400 for executing recovery code in cases in which further communication may be needed to fully recover. The processing instance begins execution of the recovery code 401. It then determines whether further communication is needed in order to fully recover (decision block 402). If further communication is not needed (the No branch in decision block 402), the execution of recovery code ends. If further communication is needed (the Yes branch in decision block 402), then the processing instance optionally stores the state information for the processing instance back into persistent memory (act 403). When another message for the transaction is received (act 404), the processing instance reloads the state information from persistent memory to system memory (act 405). Execution of recovery code is then continued (act 406). This process repeats until the processing instance finally determines that further communication is not needed (the No branch in decision block 402).

Figure 5:
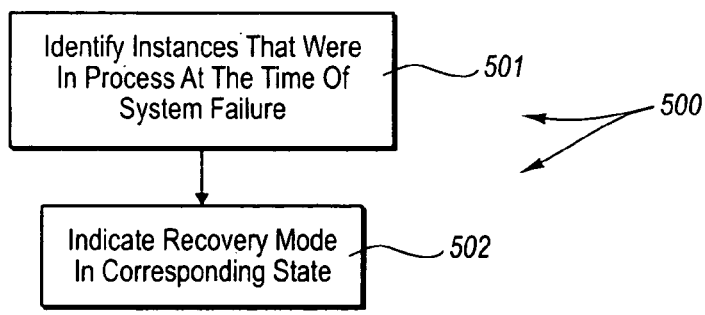
FIG. 5 illustrates a flowchart of a method for indicating whether or not a processing instance is in recovery mode.

FIG. 5 illustrates a method 500 for indicating whether or not a processing instance is in recovery mode. This method may be performed by, for example, the recovery detection component 201. This method 500 is just one of may way of detecting whether or not a processing instance should be suspicious about whether or not it is running normally. Recovery may be appropriate when, for example, the application state has become corrupted or is missing. This corrupted or missing state may also be identified by the recovery detection component 201.

The recover detection component 201 identifies processing instances that were running at the time of a system failure (act 501), and indicates in state information associated with each of the identified processing instances that the corresponding processing instance is in recovery mode (act 502). When the processing instance starts, and determines that it is operating in normal mode (see left branch of decision block 312), part of the execution of normal code may actually be for the processing instance to persistently set its own state as reflecting recovery mode in persistent memory. Once processing is complete for a particular message, the recover detection module 201 or the processing instance itself may change the state information to reflect a normal mode. Should the processing instance terminate abnormally, the persistent state information will reflect a recovery mode during the next loading of the state information from persistent memory. This would prompt the processing instance to go into recovery mode. The detection of corrupted or missing state may also prompt the processing instance to go into recovery mode.

The recovery may by adaptive. In particular, each processing instance may be in normal mode or recovery mode independent of the other processing instances. For example, processing instance 220 may be in recovery mode, while processing instance 210 is in normal mode. The processing instance itself is what evaluates itself and ultimately causes itself to exit recovery mode back into normal mode. This is a particularly efficient way of recovering since the processing instance need not execute any recovery code at all if it is in normal operation. The processing instance may instead rely completely on a system-wide component (e.g., the recovery detection module 201) for an assessment about whether it should be operating in normal mode. Moreover, this avoids the whole system being in recovery mode. A processing instance may undergo normal processing even if other processing instances (even potentially processing instances of the same application) are in recovery mode. Accordingly, processing cycles are preserved since recovery code is not executed unless it is more likely needed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that includes one or more processors, persistent memory configured to store information that persists through power loss of the computing system, and system memory that may be directly accessed by the one or more processors, a method for recovering from a system failure, the method comprising the following:

an act of receiving a message corresponding to a particular message transaction following a message exchange pattern;

an act of loading state information for the message transaction from persistent memory to system memory in response to having received the message;

an act of determining from the state information whether or not the processing instance associated with the particular message transaction is in recovery mode; and an act of branching process flow depending on whether or not the processing instance is in recovery mode;

wherein the act of determining from the state information whether or not the processing instance associated with the particular message transaction is in recovery mode comprises an act of determining that the processing instance is in recovery mode;

wherein the act of branching process flow depending on whether or not the processing instance is in recovery mode comprises an act of executing recovery code; and wherein the act of executing of the recover code comprises the following:

an act of beginning execution of the recovery code;

an act of determining that further communication is needed in order to fully recover;

an act of storing the state information for the processing instance back into persistent memory upon determining that further communication is needed in order to fully recover;

an act of receiving a second message;

an act of reloading the state information from persistent memory to system memory in response to having received the second message;

an act of continuing execution of the recovery code upon reloading the state information.

2. In a computing system that includes one or more processors, persistent memory configured to store information that persists through power loss of the computing system, and system memory that may be directly accessed by the one or more processors, a method for recovering from a system failure, the method comprising the following:

an act of receiving a message corresponding to a particular message transaction following a message exchange pattern;

an act of loading state information for the message transaction from persistent memory to system memory in response to having received the message;

an act of determining from the state information whether or not the processing instance associated with the particular message transaction is in recovery mode;

an act of branching process flow depending on whether or not the processing instance is in recovery mode; and wherein the message is a first message, the message transaction is a first message transaction, the processing instance is a first processing instance, and the state information is first state information, the method further comprising the following:

an act of receiving a second message of a second message transaction;

an act of loading second state information for the second message transaction from persistent memory to system memory in response to having received the second message; and an act of determining from the second state information whether or not the processing instance associated with the second message is in recovery mode.

3. A method in accordance with claim 2, wherein the message exchange pattern is a first message exchange pattern, wherein the second message transaction is in accordance with a second message exchange pattern that is different than the first message exchange pattern.

4. A method in accordance with claim 2, wherein the second message transaction is in accordance with the message exchange pattern of the first message.

5. A method in accordance with claim 2, wherein the first state information indicates that the first processing instance is in recovery mode, while at the same time the second state information indicates that the second processing instance in not in recovery mode.

6. In a computing system that includes one or more processors, persistent memory configured to store information that persists through power loss of the computing system, and system memory that may be directly accessed by the one or more processors, a method for recovering from a system failure, the method comprising the following:

an act of receiving a message corresponding to a particular message transaction following a message exchange pattern;

an act of loading state information for the message transaction from persistent memory to system memory in response to having received the message;

an act of determining from the state information whether or not the processing instance associated with the particular message transaction is in recovery mode;

an act of branching process flow depending on whether or not the processing instance is in recovery mode;

an act of identifying a plurality of processing instances that were running at the time of a system failure; and an act of indicating in state information associated with each of the identified plurality of processing instances that the corresponding processing instance is in recovery mode, wherein the plurality of processing instances includes the processing instance.

7. A computer program product for use in a computing system that includes one or more processors, persistent memory configured to store information that persists through power loss of the computing system, and system memory that may more directly accessed by the one or more processors, a computer program product for implementing a method for recovering from a system failure, the computer program product comprising one or more recordable-type computer-readable storage media having thereon computer-executable instructions that, when executing by the one or more processors, cause the computing system to perform the following:

an act of detecting receipt of a message corresponding to a particular message transaction that follows a message exchange pattern;

an act of loading state information for the message transaction from persistent memory to system memory in response to having received the message;

an act of determining from the state information whether or not the processing instance associated with the particular message transaction is in recovery mode; and an act of branching process flow depending on whether or not the processing instance is in recovery mode;

wherein the computer-executable instructions for performing the act of determining from the state information whether or not the processing instance associated with the particular message transaction is in recovery mode comprise computer-executable instructions that, when executed by the one or more processors, cause the computing system to perform the following:

an act of determining that the processing instance is in recovery mode;

wherein the computer-executable instructions for performing the act of branching process flow depending on whether or not the processing instance is in recovery mode comprise computer-executable instructions that, when executed by the one or more processors, cause the computing system to perform the following:

an act of executing recovery code; and wherein the computer-executable instructions for perform the act of executing of the recover code comprise computer-executable instructions that, when executed by the one or more processors, cause the computing system to perform the following:

an act of beginning execution of the recovery code;

an act of determining that further communication is needed in order to fully recover;

an act of storing the state information for the processing instance back into persistent memory upon determining that further communication is needed in order to fully recover;

an act of receiving a second message;

an act of reloading the state information from persistent memory to system memory in response to having received the second message;

an act of continuing execution of the recovery code upon reloading the state information.

8. A computer program product for use in a computing system that includes one or more processors, persistent memory configured to store information that persists through power loss of the computing system, and system memory that may more directly accessed by the one or more processors, a computer program product for implementing a method for recovering from a system failure, the computer program product comprising one or more recordable-type computer-readable storage media having thereon computer-executable instructions that, when executing by the one or more processors, cause the computing system to perform the following:

an act of detecting receipt of a message corresponding to a particular message transaction that follows a message exchange pattern;

an act of loading state information for the message transaction from persistent memory to system memory in response to having received the message;

an act of determining from the state information whether or not the processing instance associated with the particular message transaction is in recovery mode; and an act of branching process flow depending on whether or not the processing instance is in recovery mode;

wherein the message is a first message, the message transaction is a first message transaction, the processing instance is a first processing instance, and the state information is first state information, the one or more computer-readable media further having thereon computer-executable instructions that, when executed by the one or more processors, cause the computing system to perform the following:

an act of detecting receipt of a second message of a second message exchange pattern;

an act of loading second state information for the second message transaction from persistent memory to system memory in response to having received the second message; and an act of determining from the second state information whether or not the processing instance associated with the second message is in recovery mode.

9. A computer program product in accordance with claim 8, wherein the message exchange pattern is a first message exchange pattern, wherein the second message transaction is in accordance with a second message exchange pattern that is different than the first message exchange pattern.

10. A computer program product in accordance with claim 8, wherein the second message transaction is in accordance with the message exchange pattern of the first message.

11. A computer program product in accordance with claim 8, wherein the first state information indicates that the first processing instance is in recovery mode, while at the same time the second state information indicates that the second processing instance in not in recovery mode.

12. A computer program product for use in a computing system that includes one or more processors, persistent memory configured to store information that persists through power loss of the computing system, and system memory that may more directly accessed by the one or more processors, a computer program product for implementing a method for recovering from a system failure, the computer program product comprising one or more recordable-type computer-readable storage media having thereon computer-executable instructions that, when executing by the one or more processors, cause the computing system to perform the following:

an act of detecting receipt of a message corresponding to a particular message transaction that follows a message exchange pattern;

an act of loading state information for the message transaction from persistent memory to system memory in response to having received the message;

an act of determining from the state information whether or not the processing instance associated with the particular message transaction is in recovery mode; and an act of branching process flow depending on whether or not the processing instance is in recovery mode;

wherein the one or more computer-readable media further have thereon computer-executable instructions that, when executed by the one or more processors, cause the computing system to further perform the following:

an act of identifying a plurality of processing instances that were running at the time of a system failure; and an act of indicating in state information associated with each of the identified plurality of processing instances that the corresponding processing instance is in recovery mode, wherein the plurality of processing instances includes the processing instance.

13. A computer program product for use in a computing system that includes one or more processors, persistent memory configured to store information that persists through power loss of the computing system, and system memory that may more directly accessed by the one or more processors, a computer program product for comprising one or more recordable-type computer-readable storage media having thereon computer-executable instructions that, when executing by the one or more processors, cause the computing system to instantiate in the system memory the following:

a plurality of processing instances, each associated with a particular message transaction, each processing instance being configured to load state information for the message transaction from persistent memory to system memory in response to having received a message for the message transaction, determine from the state information whether or not the processing instance associated with the particular message transaction is in recovery mode, and branch process flow depending on whether or not the processing instance is in recovery mode; and a recovery detection component configured to identify the plurality of processing instances as running at the time of a system failure; and indicating in state information associated with each of the identified plurality of processing instances that the corresponding processing instance is in recovery mode.

* * * * *